(12) United States Patent
Nakahara et al.

(10) Patent No.: US 6,522,424 B1
(45) Date of Patent: Feb. 18, 2003

(54) IMAGE DATA TRANSFER SYSTEM AND METHOD

(75) Inventors: Kouji Nakahara, Tokyo (JP); Tetsuichirou Yamamoto, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/247,567

(22) Filed: Feb. 10, 1999

(30) Foreign Application Priority Data

Mar. 9, 1998 (JP) ............................................. 10-056919

(51) Int. Cl.[7] ............................................. G06F 12/00
(52) U.S. Cl. ...................... 358/1.17; 358/1.16; 358/425; 358/426.04; 358/505; 382/173; 382/164; 710/4
(58) Field of Search ............................... 358/1.17, 1.16, 358/500, 530, 425, 426.04; 382/173, 164; 379/100.1, 100.17; 341/67, 95; 710/1, 4

(56) References Cited

U.S. PATENT DOCUMENTS

| | | | | |
|---|---|---|---|---|
| 3,609,670 A | * | 9/1971 | Knowlton | 345/636 |
| 4,131,915 A | * | 12/1978 | Nakagome et al. | 358/260 |
| 4,222,076 A | * | 9/1980 | Knowlton | 358/426.02 |
| 4,586,088 A | * | 4/1986 | Kondo | 358/257 |
| 4,739,397 A | * | 4/1988 | Hyashi | 358/80 |
| 4,775,893 A | * | 10/1988 | Ishikawa | 358/261.1 |
| 4,855,995 A | * | 8/1989 | Hiyama et al. | 370/460 |
| 4,992,887 A | * | 2/1991 | Aragaki | 358/403 |
| 5,046,119 A | * | 9/1991 | Hoffert et al. | 358/524 |
| 5,272,703 A | * | 12/1993 | Peters | 370/102 |
| 5,331,439 A | * | 7/1994 | Bachar | 358/500 |
| 5,398,109 A | * | 3/1995 | Amakawa et al. | 358/517 |
| 5,485,283 A | * | 1/1996 | Kaneko | 358/518 |
| 5,532,844 A | * | 7/1996 | Kagami et al. | 358/442 |
| 5,720,021 A | * | 2/1998 | Murata et al. | 345/581 |
| 5,850,261 A | * | 12/1998 | Kondo et al. | 358/420 |
| 5,926,559 A | * | 7/1999 | Ohta | 358/523 |
| 5,973,628 A | * | 10/1999 | McDonnell et al. | 341/67 |
| 5,999,644 A | * | 12/1999 | Sigiura | 358/500 |
| 6,240,217 B1 | * | 5/2001 | Ercan et al. | 382/105 |

FOREIGN PATENT DOCUMENTS

JP 40627415 * 9/1994 ............ G09G/5/36

OTHER PUBLICATIONS

JPEG, Still Image Data Compression Standard, William Pennebaker and Joan Mitchell, International Thompson Publishing, 1993, pp 325; pp 346–352.*
Digital Image Compression Techniques, Majid Rabbani and Paul W. Jones, SPIE Optical Engineering Press, 1991, pp. 190–195.*

* cited by examiner

Primary Examiner—Edward Coles
Assistant Examiner—Tia A. Carter
(74) Attorney, Agent, or Firm—Foley & Lardner

(57) ABSTRACT

An image data transfer system and method enable scan time and transfer time of the image data to be adjusted appropriately without lacking a part of the image data, suitable for low price. A data segmentation device segments the image data from a scan device into high order n bits and low order (N−n) bits, subsequently, transferring the high order n bits toward a data transfer device at the same time when the scan device scans a manuscript, and transferring the low order (N−n) bits toward a memory device. The data transfer device transfers the high order n bits of the image data toward a personal computer at the same time when the scan device scans the manuscript. The memory device stores therein the low order (N−n) bits of the image data temporarily. Furthermore, the data transfer device scans the low order (N−n) bits of the image data from the memory device to transfer toward the personal computer after transfer of the high order n bits.

15 Claims, 5 Drawing Sheets

F I G. 1
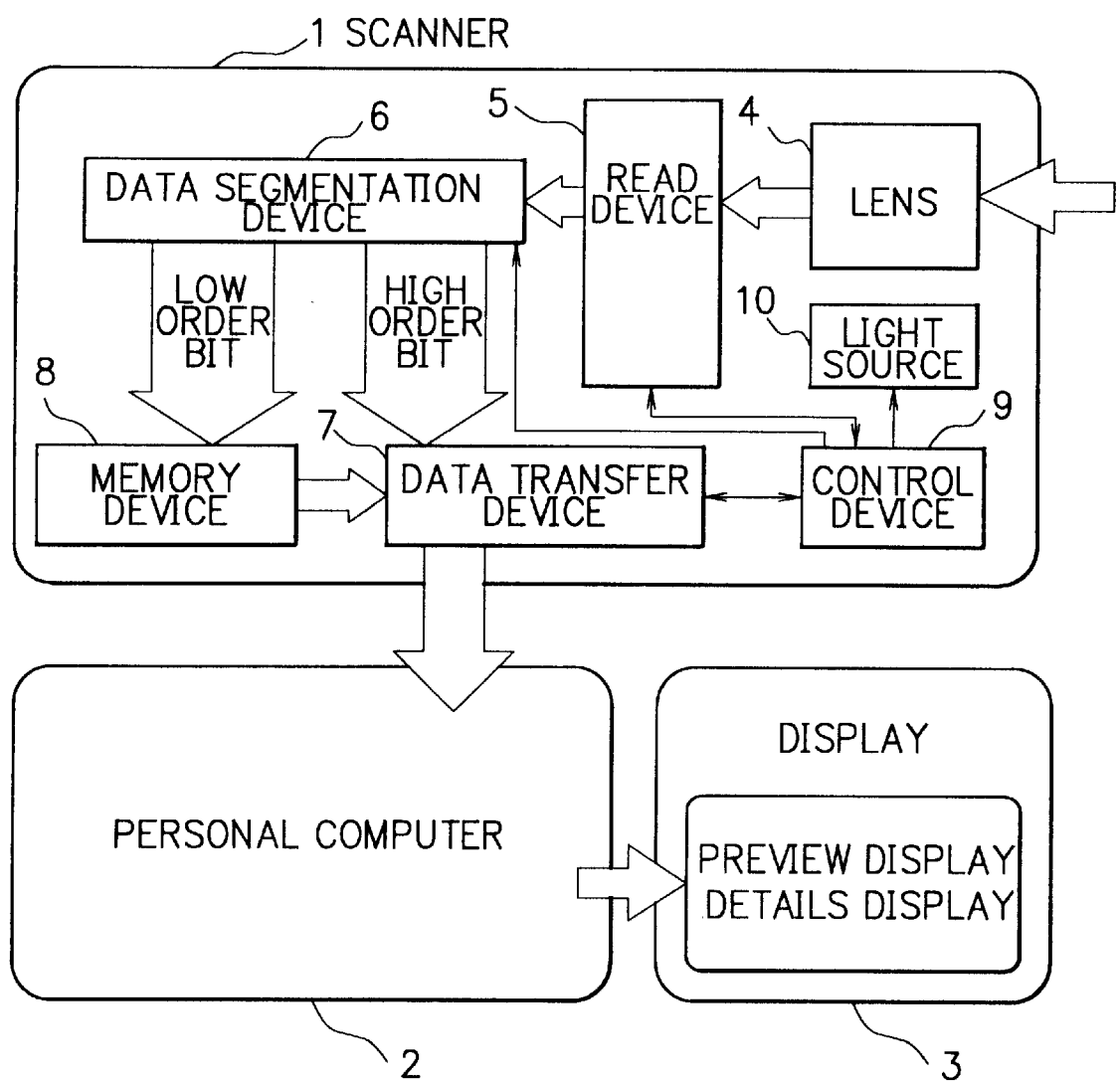

FIG. 3

| n | INITIAL TRANSFER DATA QUANTITY (MByte/1SHEET) | NECESSARY INTERNAL MEMORY CAPACITY (MByte) | PREVIEW DISPLAY | | |
|---|---|---|---|---|---|
| | | | bit/pixel | COLOR NUMBER | MAXIMUM ERROR IN ACTUAL VALUE (EACH COLOR) |
| 0 | 0.0 | 45.7 | 0 | 1 | 128 |
| 1 | 5.8 | 40.0 | 3 | 8 | 64 |
| 2 | 11.5 | 34.3 | 6 | 64 | 32 |
| 3 | 17.2 | 28.6 | 9 | 512 | 16 |
| 4 | 22.9 | 22.9 | 12 | 4096 | 8 |
| 5 | 28.6 | 17.2 | 15 | 32768 | 4 |
| 6 | 34.3 | 11.5 | 18 | 262144 | 2 |
| 7 | 40.0 | 5.8 | 21 | 2097152 | 1 |
| 8 | 45.7 | 0.0 | 24 | 16777216 | 0 |
| | IN THE CASE OF A4, 400dpi | | | | |

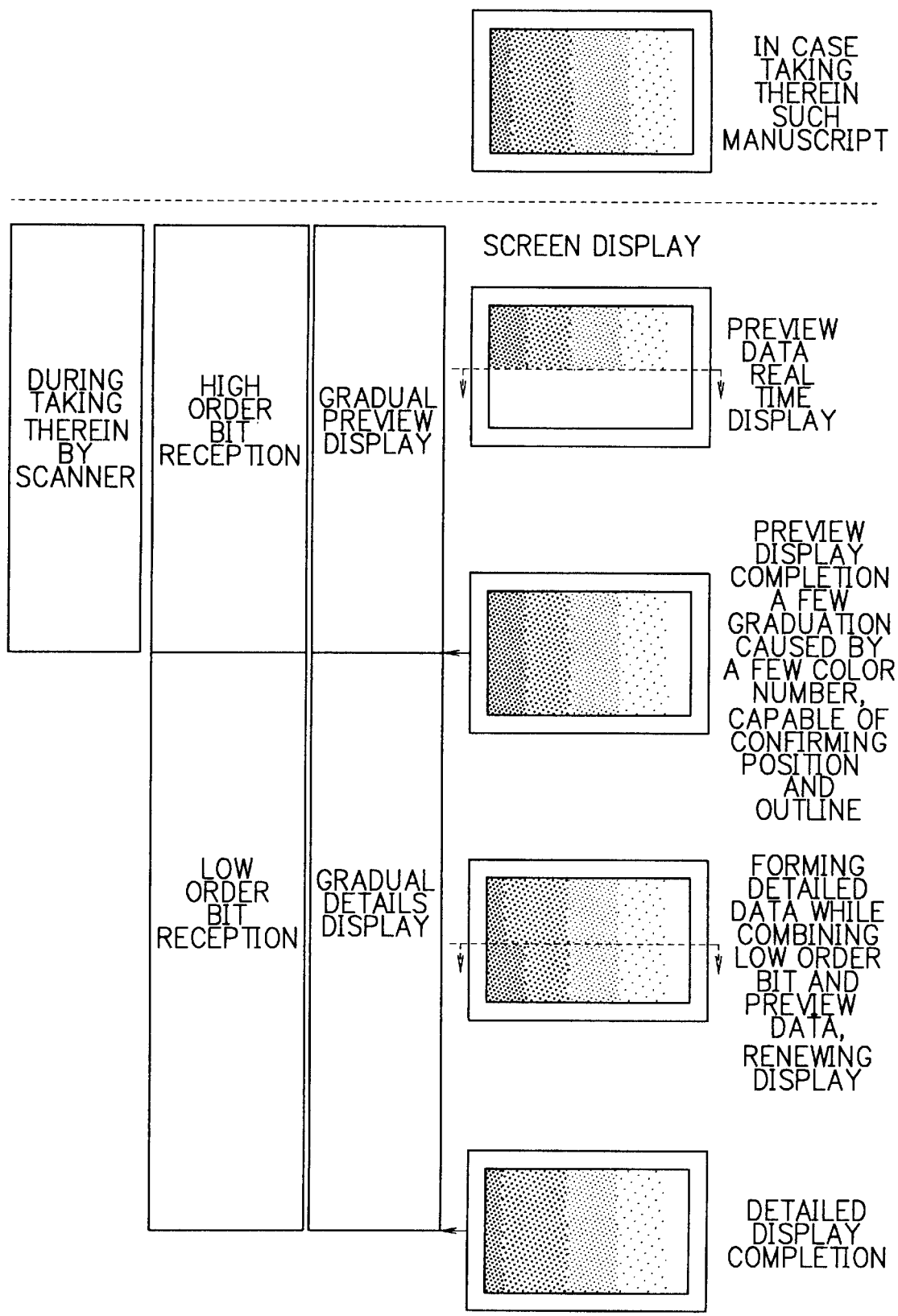

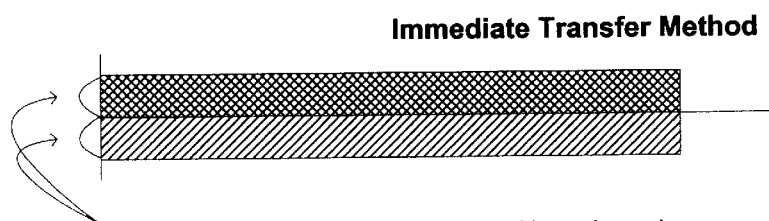

Data Read Time [area constant on graph for constant data quantity]

Data Transfer Time (scanner to PC, or internal memory to PC) [constant area on graph]

Data Transfer Time (scanner to internal memory) [area on graph indicates necessary internal memory capacity]

*Lateral direction of graphs represents time, longitudinal direction represents speed

Figure 5a

Immediate Transfer Method

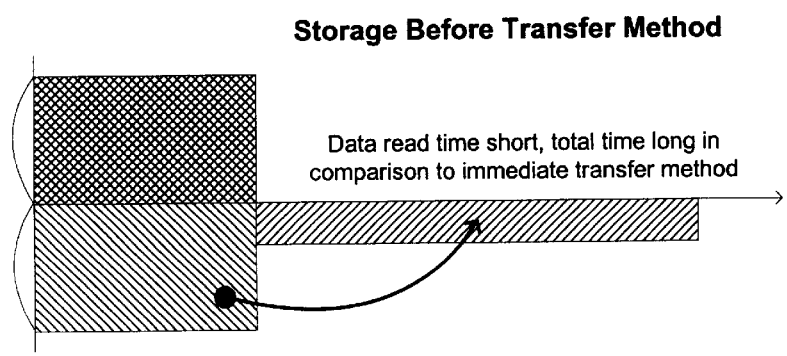

Figure 5b

*Total transfer speed equals read speed in each graph

Storage Before Transfer Method

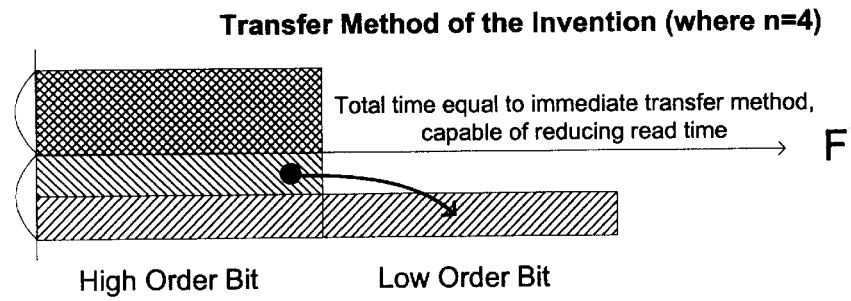

Data read time short, total time long in comparison to immediate transfer method

Figure 5c

Transfer Method of the Invention (where n=4)

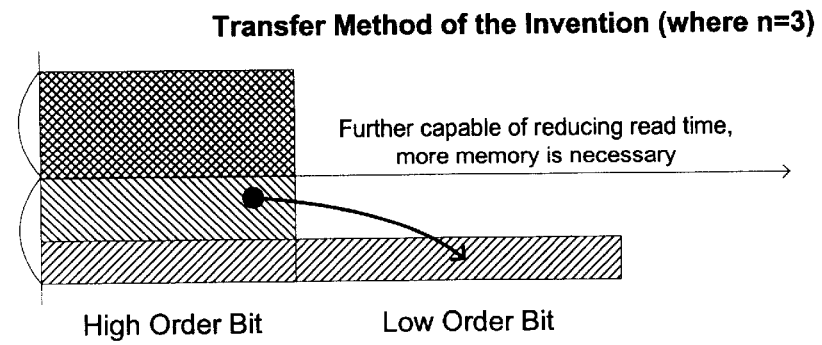

Total time equal to immediate transfer method, capable of reducing read time

Figure 5d

High Order Bit    Low Order Bit

Transfer Method of the Invention (where n=3)

Further capable of reducing read time, more memory is necessary

Figure 5e

High Order Bit    Low Order Bit

IMAGE DATA TRANSFER SYSTEM AND METHOD

BACKGROUND OF THE INVENTION

The present invention relates to an image data transfer system and method, which transfer an image data scanned by scanner toward a personal computer.

DESCRIPTION OF THE PRIOR ART

A conventional first image data transfer system is to transfer all of image data scanned by a scanner toward a personal computer at all times. Further, a conventional second image data transfer system is provided with a memory device capable of storing therein image data corresponding quantity of one sheet of the manuscript or several sheets of the manuscript on the inside of the scanner. The second system is to store the image data scanned by the scanner in the memory device once. Then the second system to transfer the data successively after completion of the scan.

However, in the conventional first image data transfer system, there is a problem that scan speed is behind time, because the time is required for transferring large size data such as image data with full color and so forth. The scan speed follows thereto. Furthermore, when a handy scanner is used, if the speed to move the handy scanner is too fast, there is the problem that a part of the image data is chipped because a transfer is not in time.

Moreover, in the conventional second image data transfer system, scan time becomes short, however, time is required for transfer, and there is the problem that the price becomes high because it is necessary for preparing a memory device capable of storing therein large amount of image data.

SUMMARY OF THE INVENTION

In view of the foregoing, it is an object of the present invention, in order to achieve the above mentioned problem, to provide an image data transfer system and method. The image data transfer system and method enable a scan time and a transfer time of the image data to be adjusted appropriately without lacking a part of the image data, and which is to adapt for low price system.

According to a first aspect of the present invention, in order to achieve the above-mentioned object, there is provided an image data transfer system. The image data transfer system comprises a data segmentation means for segmenting the image data into high order n bits and low order (N−n) bits, obtained through the scan of a manuscript by a scan device, a first data transfer means for transferring the high order n bits of the image data toward a personal computer, while scanning manuscript by the scan device, a temporary memory for storing therein the low order (N−n) bits of the image data temporarily, and a second data transfer means for transferring the low order (N−n) bits of the image data stored in said temporary memory toward the personal computer after transferring of the high order n bits by the first data transfer means.

According to a second aspect of the present invention, in the above first aspect wherein the first data transfer means and the second data transfer means are constituted by the same data transfer device.

According to a third aspect of the present invention, in the above first aspect wherein the n is capable of being established selectively.

According to a fourth aspect of the present invention, in the above third aspect wherein the first data transfer means and the second data transfer means are constituted by the same data transfer device.

According to a fifth aspect of the present invention, in the above first aspect wherein the n is capable of being established selectively in every image data of respective colors of red, green and blue.

According to a sixth aspect of the present invention, in the above fifth aspect wherein the first data transfer means and the second data transfer means are constituted by the same data transfer device.

According to a seventh aspect of the present invention, there is provided an image data transfer method which comprises a step of data segmentation for segmenting the image data which is obtained by scanning the manuscript through the scan device, into a high order n bits and a low order (N−n) bits, a step of a first data transfer for transferring the high order n bits of the image data toward a personal computer at the same time when scanning manuscript by said scan device, a step of temporary storage for storing low order (N−n) bits of the image data in a memory device temporarily, and a step of a second data transfer for transferring the low order (N−n) bits of the image data which is stored in the memory device toward the personal computer after transferring the high order n bits by the step of the first data transfer.

The above and further objects and novel features of the invention will be more fully understood from the following detailed description when the same is scanned in connection with the accompanying drawings. It should be expressly understood, however, that the drawings are for purpose of illustration only and are not intended as a definition of the limits of the invention.

BRIEF DESCRIPTION OF THE DRAWINGS

FIG. 1 is a block diagram showing an image data transfer system by way of one embodiment of the present invention;

FIG. 3 is a view for explaining change of respective numeral value depending on value of n in the image data transfer system of FIG. 1;

FIG. 4 is a view for explaining an indication of the image data in the image data transfer system of FIG. 1; and FIG. 5 is a view for explaining the data scan time and the data transfer time in the image data transfer system of FIG. 1 while comparing with conventional method.

DETAILED DESCRIPTION OF THE PREFERRED EMBODIMENTS

Figure 2:
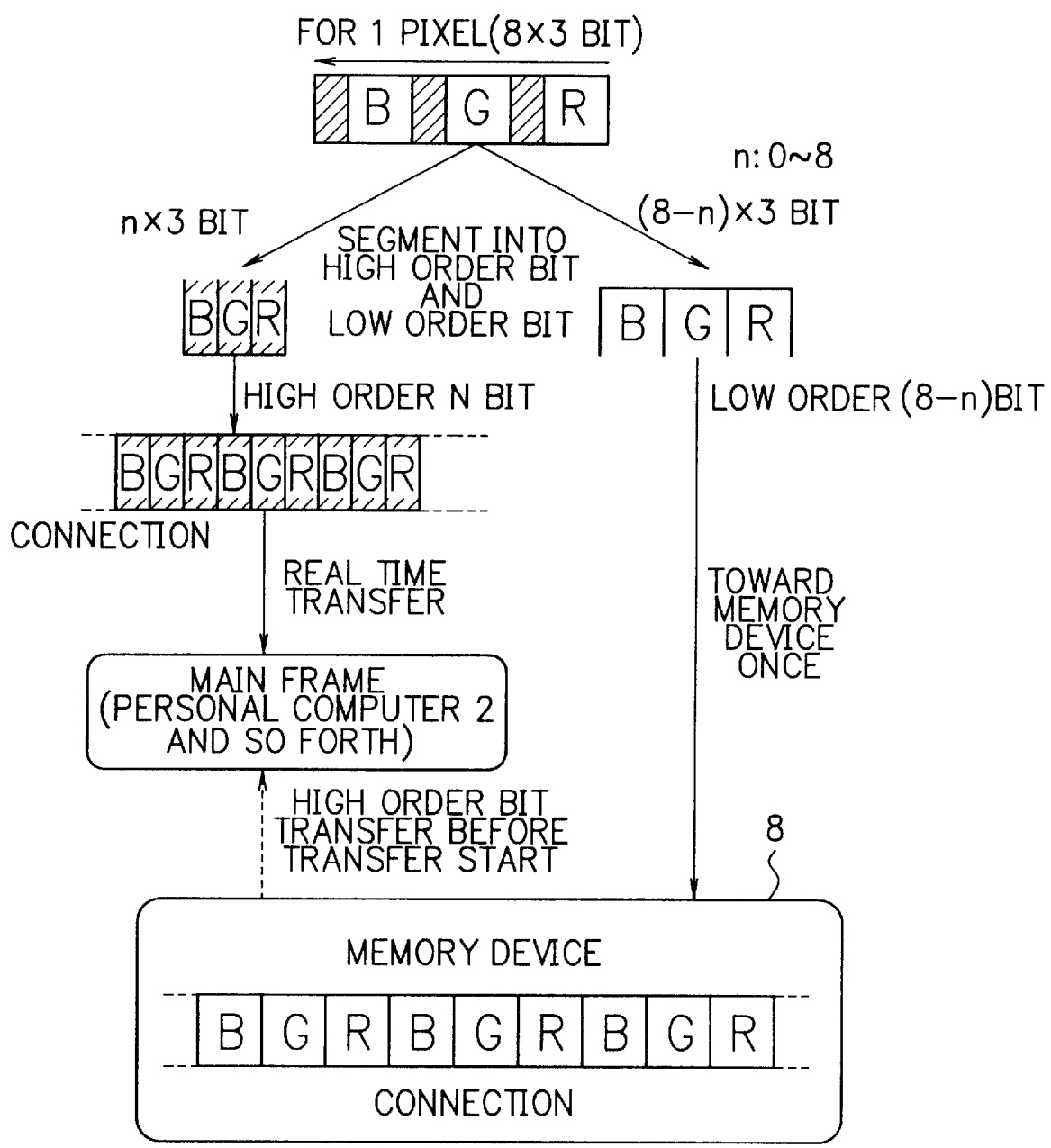
FIG. 2 is a view for explaining operation of the image data transfer system of FIG. 1.

A preferred embodiment of the invention will be now described in detail in accordance with the accompanying drawings.

FIG. 1 shows an image data transfer system by way of one embodiment of the present invention. As shown in FIG. 1, the image data transfer system is provided with a scanner 1 for scanning the image data of the manuscript, a personal computer 2 for processing data while receiving the image data from the scanner 1, and a display 3 for displaying the image data while receiving the image data from the personal computer 2.

The scanner 1 comprises a lens 4, a scan device 5, a data segmentation device 6, a data transfer device 7, a memory device 8, a control device 9, and a light source 10. The scanner 1 is a full color scanner. The lens 4 images an image of the manuscript to form an image light. The scan device 5 scans the image light to transform it to an image data of electric signal.

The data segmentation device 6 segments the image data from the scan device 5, into high order n bits and low order (N−n) bits, thus the high order n bits are transferred toward the data transfer device 7 while scanning the manuscript by the scan device 5, and transferring the low order (N−n) bits toward the memory device 8. The data transfer device 7 transfers the high order n bits of the image data toward the personal computer 2 while scanning the manuscript by the scan device 5.

The memory device 8 stores therein the low order (N−n) bits of the image data temporarily. Furthermore, the data transfer device 7 scans out the low order (N−n) bits from the memory device 8 to transfer toward the personal computer 2 after transfer of the high order n bits.

The scanner 1 of the present invention requires the data segmentation device 6 and the memory device 8 in comparison with the general conventional scanner. However, since the memory device 8 is unnecessary to store therein the image data of one sheet of the manuscript, it is capable of being constituted the memory device 8 in a low price than the scanner of type that the whole scan image data is stored in the internal memory device once. The data segmentation device 6 enables the data of N×3 bits in every 1 pixel to be segmented into the high order n×3 bits (N>n) and the low order (N−n)×3 bits to transfer toward respective another destinations of transfer. For instance, in the case of 1 pixel 8 bits A/D, N is N=8.

Hereinafter, there will be described as being N=8. The personal computer 2 does not require special hardware equipment, thus capable of coping therewith by only processing of the software. The scanner 1 is connected to the personal computer 2 in accordance with the conventional connection method.

In FIG. 1, the scan device 5 scans out the image light of the manuscript to form the image data with full color. The image data of the full color permits 1 pixel to be represented by total 24 bits in respective every colors 8 bits of red (R), green (G), and blue (B). The data segmentation device 6 segments the image data transferred, as shown in FIG. 2, in such a way that there is segmented the respective color 8 bits into the high order n bits and the low order (8−n) bits. The scan device 5 transfers the bit-data toward the personal computer 2 through the data transfer device 7 while integrating to be connected only the high order bits in the real time. The data segmentation device 6 causes the remaining low order bits to be integrated together, thus transmitting toward the memory device 8 within the scanner 1. The memory device 8 stores therein the low order bits temporarily.

As to the image data of the low order bits of the memory device 8, there is started the transfer of the image data toward the personal computer 2 at the time when the transfer of the high order bits by the data transfer device 7 is terminated after completion of the scan of the manuscript, and after confirmation that interruption order of transfer is not transferred. Here, the value which is established by way of n is to be variable, thus it is suitable so as to select the optimum value as n from the whole image data quantity to be scanned (manuscript size) and the storage quantity and real transfer speed of the memory device 8 within the scanner 1. There is shown in FIG. 3 respective numeral values in relation to the establishment value of n.

The personal computer 2 to which the image data is transferred displays the image as a preview to the display 3 in real time using the image data of the high order bits which is transferred initially. However, in the preview screen, it is incapable of being displayed accurate image because the data of low order bits are lacked. For instance, when there is known only the high order 4 bits as being [1100], it is [1100????] by way of the image data, namely it is [11000000] to [11001111], in the decimal numeral, it is any of graduation of [192] to [207] out of 256 graduation numbers. Here, for instance, even if there is displayed it by way of the graduation of [200] of intermediate one, there is scarcely differences of the real value therebetween. While when there is known only the low order 4 bits instead of only the high order, there can be thought 16 cases similar to the case of the high order bits, however, there might be largely differences of the real value therebetween, because they are not continuous numbers.

As to the preview screen processed, color is not accurate, and there can not be displayed quality touch of the material, however, there can be known the outline whether or not scan location by the scanner 1 is correct and so forth. If when there is not obtained required image while seeing the preview screen, it is suitable to interrupt processing without waiting the low order bits to be transferred. While when there is no problem while seeing the preview screen, there is formed accurate image while receiving the low order bits continuously, thus displaying on the display 3 to be preserved after the final confirmation. FIG. 4 shows a concrete embodiment according to the present invention.

The largest problem in the scan speed at the time when there is scanned the manuscript by the scanner 1 of full color, is the data transfer from the scanner 1 to the personal computer 2. According to the image data transfer system and method of the present invention, it is capable of scanning the manuscript at high speed while reducing the waiting of transfer, in comparison with the method in which there is no memory to be stored therein the manuscript data within the scanner 1 (hereinafter referring to immediate transfer method). Further, according to the image data transfer system and the method of the present invention, which causes the image of the manuscript to be scanned to transfer a part of the data simultaneously, therefore, it is capable of advancing a completion time of the transfer in comparison with the method in which there is stored the whole image data in the internal memory once, then transmitting it (hereinafter referring to memory storing therein before transfer method) to the personal computer. Furthermore, it is capable of manufacturing the scanner device cheaply because there is not much storing quantity of the memory device.

FIG. 5 shows a comparison result on the time base between the conventional method and the data transfer based on the present invention. In FIG. 5, the time base is in the lateral direction. There is arranged scan of the data at upper side of the time base, and there is arranged the data transfer at lower side of the time base. In FIG. 5, traveling quantity in every unit time namely scan/transfer-speed of the data is in the longitudinal direction (thickness direction). Consequently, the area represented through FIG. 5, becomes the whole quantity of the scan/transfer-data, this is constant value independent on respective methods.

In FIG. 5, the immediate transfer method has long time for scanning while adjusting to data transfer because the scan and the data transfer are implemented simultaneously. The memory storing therein before transfer method, since the scan data is transferred to a high speed internal memory device beforehand, is that whose scanning time becomes very fast, however, the total time becomes long because there is implemented the scan and the data transfer toward the personal computer at respective different times severally. In comparison with these methods, the present invention has the same total times as that of the immediate transfer method, because the data transfer of a part of data is always implemented, and only remaining data is stored in the internal memory, so that it is capable of being reduced the scan time.

Furthermore, in the present invention, it enables the same operation to be implemented as that of the scanner of the immediate transfer method with the value of n as 8, while it enables the same operation to be implemented as that of the scanner of the memory storing therein before transfer method with the value of n as 0. Moreover, since there can be seen the whole outline by way of the preview screen, it is capable of reducing dead time if there is interrupted the operation at the step during transfer because of recognition of failure in comparison with the matter that there is done over again while taking notice of failure after completion of the transfer.

Next, there will be described another embodiment of the present invention.

There can be established selectively the value of n in every red (R), green (G) and blue (B), namely the value of n can be changed in every color. In the above description, there is used the same value by way of n in relation to the whole of red (R), green (G) and blue (B). However, it is not necessarily to be the same value. For instance, when there is scanned the manuscript which is inclining to red, the value of n (nR) in relation to red (R) is increased, thus the values of n (nG, nB) in relation to green (G) and blue (B) are decreased in answer to red (R), with the result that it is capable of being improved the reproducibility of color in the preview screen slightly in the same transfer method.

When there is applied the present invention to a color facsimile device and a color copying machine, it is necessary to prepare a color liquid crystal display for displaying a preview image. It is suitable to implement simple printing instead of the preview. The present invention can not be applied to the binary image in the case of monochrome image, while the present invention can be applied to a multi-valued gradation depending on gray scale as it is.

As described above, the image data transfer system and method enable scan time and transfer time of the image to be adjusted appropriately without lacking a part of the image data, and being adapted for low price.

While preferred embodiments of the invention have been described using specific terms, such description is for illustrative purpose only, and it is to be understood that changes and variations may be made without departing from the spirit or scope of the following claims.

What is claimed is:

1. An image data transfer system comprising:
a data segmentation means for segmenting N-bit pixel data of an image into n high order bits and (N−n) low order bits for respective pixels, the image data being obtained through scanning of an image by a scanning device;
a first data transfer means for transferring the high order bits of said image to a personal computer during said scanning;
a temporary memory for storing therein the low order bits of said image temporarily; and
a second data transfer means for transferring the low order bits of said image stored in said temporary memory to said personal computer after transferring of said high order bits of said image.

2. An image data transfer system as claimed in claim 1, wherein said first data transfer means and said second data transfer means are comprised of the same data transfer device.

3. An image data transfer system as claimed in claim 1, wherein said number of high order bits n is configurable.

4. An image data transfer system as claimed in claim 3, wherein said first data transfer means and said second data transfer means are comprised of the same data transfer device.

5. An image data transfer system as claimed in claim 1, wherein said number of high order bits n is independently configurable for respective red, green and blue pixel data.

6. An image data transfer system as claimed in claim 5, wherein said first data transfer means and said second data transfer means are comprised of the same data transfer device.

7. An image data transfer method comprising:
segmenting N-bit pixel data of an image into n high order bits and (N−n) low order bits for respective pixels, the image data being obtained through scanning of an image by a scanning device;
transferring said high order bits of said image to a personal computer during said scanning;
temporarily storing said low order bits of said image in a memory device; and
transferring the low order bits of said image stored in said memory device to said personal computer after transferring the high order bits of said image.

8. An image data transfer system as claimed in claim 1, wherein said image is a color image and said pixel data comprises groups of N bits representing respective component color values of respective pixels, each of said groups being segmented into respective n high order bits and (N−n) low order bits.

9. An image data transfer system as claimed in claim 1, wherein said image is a monochrome image and said pixel data comprises groups of N bits representing gray scale values of respective pixels, each of said groups being segmented into respective n high order bits and (N−n) low order bits.

10. An image data transfer method as claimed in claim 7, wherein said image is a color image and said pixel data comprises groups of N bits representing respective component color values of respective pixels, each of said groups being segmented into respective n high order bits and (N−n) low order bits.

11. An image data transfer method as claimed in claim 7, wherein said image is a monochrome image and said pixel data comprises groups of N bits representing gray scale values of respective pixels, each of said groups being segmented into respective n high order bits and (N−n) low order bits.

12. A method for transferring image data comprising:
segmenting N-bit pixel data of respective pixels of the image into n high order bits and (N−n) low order bits for said respective pixels;
transferring the high order bits of said image; and
transferring the low order bits of said image after completing transfer of all high order bits.

13. A method as claimed in claim 12, wherein said image is a color image and said pixel data comprises groups of N bits representing respective component color values of respective pixels, each of said groups being segmented into respective n high order bits and (N−n) low order bits.

14. A method as claimed in claim 13, wherein said value n is defined separately for each of said respective color values.

15. A method as claimed in claim 12, wherein said image is a monochrome image and said pixel data comprises groups of N bits representing gray scale values of respective pixels, each of said groups being segmented into respective n high order bits and (N−n) low order bits.

* * * * *